US012391017B2

(12) United States Patent
Büsch et al.

(10) Patent No.: US 12,391,017 B2
(45) Date of Patent: Aug. 19, 2025

(54) ADJUSTING SYSTEM FOR ADJUSTING THE GUIDE PLAY OF A SLIDING GUIDE FOR MOVABLE PARTS OF A PRESS, AND METHOD FOR ADJUSTING THE POSITION OF AT LEAST ONE SLIDING BLOCK OF A SLIDING GUIDE ON A PRESS

(71) Applicant: SMS group GmbH, Düsseldorf (DE)

(72) Inventors: Michael Büsch, Viersen (DE); David Hüsgen, Korschenbroich (DE)

(73) Assignee: SMS group GmbH, Düsseldorf (DE)

(*) Notice: Subject to any disclaimer, the term of this patent is extended or adjusted under 35 U.S.C. 154(b) by 330 days.

(21) Appl. No.: 18/031,050

(22) PCT Filed: Oct. 8, 2021

(86) PCT No.: PCT/EP2021/077881
§ 371 (c)(1),
(2) Date: May 13, 2023

(87) PCT Pub. No.: WO2022/078903
PCT Pub. Date: Apr. 21, 2022

(65) Prior Publication Data

US 2023/0364878 A1 Nov. 16, 2023

(30) Foreign Application Priority Data

Oct. 12, 2020 (DE) .................... 10 2020 212 830.8

(51) Int. Cl.
*B30B 15/04* (2006.01)

(52) U.S. Cl.
CPC ................................ *B30B 15/041* (2013.01)

(58) Field of Classification Search
CPC ....... B30B 1/40; B30B 15/041; B21D 28/325; B21D 37/12
See application file for complete search history.

(56) References Cited

U.S. PATENT DOCUMENTS 4,213,509 A 7/1980 Hafner
5,024,736 A 6/1991 Clauss et al.
(Continued)

FOREIGN PATENT DOCUMENTS

CN 201046513 4/2008
CN 201669364 U 12/2010
(Continued)

*Primary Examiner* — Jimmy T Nguyen
(74) *Attorney, Agent, or Firm* — Smartpat PLC

(57) ABSTRACT

An adjusting system for adjusting the guide play of a sliding guide for movable parts of a press has at least one guide element (1), which includes at least one sliding block (9), which can be moved transversely to the direction of movement of the part of the press to be guided, at least one adjusting wedge (5) and at least one guide wedge (8), the movement of which adjusting wedge and guide wedge relative to each other causes the sliding block (9) to be shifted perpendicularly to the direction of movement of the movable part. The adjusting system is characterized in that the adjusting wedge (5) is continuously adjustable by at least one spindle drive. The disclosure further relates to a method for adjusting the position of at least one sliding block of its sliding guide on a press having such an adjusting system.

11 Claims, 3 Drawing Sheets

(56) References Cited

U.S. PATENT DOCUMENTS

| | | | | |
|---|---|---|---|---|
| 5,746,122 | A * | 5/1998 | Gietz | B30B 15/0094 100/319 |
| 5,775,212 | A | 7/1998 | Takao | |
| 5,909,705 | A | 6/1999 | Short et al. | |
| 2016/0107406 | A1 | 4/2016 | Schreiber et al. | |
| 2021/0231171 | A1 | 7/2021 | Meyer | |

FOREIGN PATENT DOCUMENTS

| | | | | |
|---|---|---|---|---|
| CN | 107243586 | A | 10/2017 | |
| DE | 2758340 | C2 | 7/1979 | |
| DE | 3901961 | A1 | 8/1990 | |
| DE | 3935787 | A1 | 5/1991 | |
| DE | 19728893 | A1 | 1/1998 | |
| DE | 19857744 | A1 * | 6/2000 | B30B 15/0035 |
| DE | 102018111366 | A1 | 11/2019 | |
| EP | 1970173 | A1 * | 9/2008 | B26D 5/16 |
| EP | 3003701 | A1 | 12/2014 | |
| JP | S5255937 | U | 5/1977 | |
| JP | H0347619 | A | 2/1991 | |
| JP | H04141337 | A | 5/1992 | |
| JP | 2525281 | B2 | 2/1997 | |
| JP | 2011152553 | A | 8/2011 | |
| JP | 2013220474 | A | 10/2013 | |
| WO | 2011047881 | A1 | 4/2011 | |

* cited by examiner

ADJUSTING SYSTEM FOR ADJUSTING THE GUIDE PLAY OF A SLIDING GUIDE FOR MOVABLE PARTS OF A PRESS, AND METHOD FOR ADJUSTING THE POSITION OF AT LEAST ONE SLIDING BLOCK OF A SLIDING GUIDE ON A PRESS

CROSS-REFERENCE TO RELATED APPLICATION

This application is a national stage application, filed under 35 U.S.C. § 371, of International Patent Application PCT/EP2021/077881, filed on Oct. 8, 2021, which claims the benefit of German Patent Application DE 10 2020 212 830.8, filed on Oct. 12, 2020.

TECHNICAL FIELD

The disclosure relates to an adjusting system for adjusting the guide play of a sliding guide for movable parts of a press, having at least one adjustable guide element, which comprises at least one sliding block, which can be moved transversely to the direction of movement of the part of the press to be guided, at least one adjusting wedge and at least one guide wedge, the movement of which relative to each other causes the sliding block to be shifted transversely to the direction of movement of the movable part of the press. A press within the meaning of the present disclosure is, for example, a metal extrusion press as a horizontal or vertical extrusion press with a press frame and at least one running bar or die holder slidingly guided within the press frame, for example on guide columns.

BACKGROUND

A generic adjusting system is known, for example, from EP 3 003 701 B1. EP 3 003 701 B1 relates to a system and method for adjusting sliding blocks of a movable cross-member of a press with respect to a column of the press on which the sliding block can slide. The adjusting system comprises a first wedge, which is designed to be integral with the movable cross-piece, a second wedge to which the sliding block is fixed, a pin defining an axis and having a first end arranged eccentrically with respect to the axis, wherein the first end is received in a cavity provided in the second wedge, and a first actuating means for actuating the pin, which actuating means is designed such that rotation of the pin causes the first end to cause the second wedge to slide against the first wedge along a direction transverse to the axis. The pin is moved between a locked and an unlocked position by means of a second actuating means, which is designed as a hydraulic cylinder. In order to change the position of the movable wedge and thus the position of the sliding block, the pin must initially be moved to the unlocked position. Thereupon, the play is adjusted by rotating the pin with its eccentric end. After the adjustment is completed, the pin is moved back to the locked position.

This mechanism is relatively complex. Movement is time-consuming and automation of this is difficult.

Further prior art is known, for example, from document CN 107243586 A. There, an adjusting system with mutually movable wedges is also described, with which the play is adjusted by means of washers or shims, as the case may be.

Further prior art is known from the documents CN 201669364 U, DE 39 01 961 A1, JP 2525281, JP H04 141 337, DE 197 28 893 A1, DE 27 58 340 A1, CN 201 046 513 Y, WO 2011/047881 A1 and U.S. Pat. No. 5,775,212.

An additional generic adjusting system is known respectively from the publications JP 2013-220 474 A and JP 2011-152 553 A.

SUMMARY

The disclosure is based on the object of providing an adjusting system of the type mentioned above, which is simple in design and can be operated automatically.

The object is achieved by an adjusting system as disclosed herein. The object is further achieved by a method for adjusting the position of at least one sliding block of a sliding guide on a press having such an adjusting system.

According to a first aspect, an adjusting system is provided for adjusting the guide play of a sliding guide for movable parts of a press, wherein the adjusting system has at least one adjustable guide element comprising at least one sliding block which can be moved transversely to the direction of movement of the part of the press to be guided, at least one adjusting wedge and at least one guide wedge, the movement of which relative to each other causes the sliding block to be shifted transversely to the direction of movement of the movable part, wherein the adjusting system is characterized in that the adjusting wedge is continuously adjustable by means of at least one spindle drive. The adjusting system can be an integral component of a press, but this can also be designed as a correspondingly preassembled separate unit. Movable parts of a press are, for example, runner bars, die holders and the like, which can be moved, for example, between cross bars or yokes of a press frame on guide columns or the like. Preferably, the adjusting system can be installed in an open-die forging, closed-die forging, isothermal forging, ring blanking, piercing, drawing, deep-drawing and/or extrusion press.

The adjusting system is very simple to implement, particularly in terms of design. The stepless movement by means of a spindle drive makes it relatively easy to carry out an automated adjustment of the guide play of the sliding guide.

Adjustability is accomplished by means of a pair of wedges comprising an adjusting wedge and a guide wedge cooperating therewith, wherein the adjusting wedge can be continuously shifted in the direction of the spindle axis by means of a spindle connected thereto, thus allowing the guide wedge to extend or retract perpendicularly to the spindle axis. The adjusting wedge and the guide wedge are in contact with each other, wherein the adjusting wedge can be moved parallel to the spindle axis by actuating the spindle drive, thereby shifting the guide wedge transverse to the spindle axis.

With the adjusting system, it is provided that the spindle drive comprises at least one spindle driven by a servomotor, which cooperates with a movement thread of the adjusting wedge. The adjusting wedge can be designed with a corresponding threaded bore. Alternatively, it is possible that the adjusting wedge is fastened to a spindle nut in which the spindle engages. A servomotor within the meaning of the disclosure can also have a gearbox and/or act on more than one spindle.

Furthermore, at least one measured value encoder is provided, which records the guide play of the sliding guide and outputs this to an open-loop or closed-loop control device for the automatic readjustment of the guide play.

The spindle, the adjusting wedge and the guide wedge can be arranged in a common housing and form a structural unit with the sliding block as an adjustable guide element.

Expediently, the spindle is rotatably mounted in a bushing of the housing. Further expediently, the sliding block is replaceably fastened to the guide wedge.

According to an additional aspect, there is provided a press having an adjusting system of the type described above. The press can comprise a press frame and at least one running bar and/or die holder movable within the press frame, along with sliding guides for the running bar and/or the die holder. The sliding guides may be provided, for example, on guide columns of the press frame, each of which cooperates with a sliding block of an adjusting system. The press can be designed as a 2 or 4 column press, for example.

According to an additional aspect, there is provided a method for adjusting the position of at least one sliding block of a sliding guide on a press having an adjusting system of the type described above. The method is characterized by the fact that the guide play between the sliding block and a sliding surface of the part of the press to be moved is measured and compared with a predetermined guide play as a target value, wherein, if applicable, the spindle of the adjusting system is adjusted or rotated, as the case may be, until the actual guide play (actual play) corresponds to the predetermined or predefined, as the case may be, required guide play (target play).

During initial start-up, it is advantageous to calibrate the adjusting system and save the measurement data recorded during this process. In comparison with later measurement data, such data may be used, for example, to derive forecasts about the further development of the press or maintenance intervals. The recorded measurement data is preferably recorded on a data storage device and processed for later evaluation. This allows, for example, subsequent quality fluctuations of the product to be compared and/or explained with the measurement data of the press. Furthermore, it is advantageous if the measurement data are visualized to the plant operator and deviations from the target value are highlighted in color. With the method, the spindle can be adjusted automatically via an actuator as a function of a measured value of the guide play recorded by a measured value encoder. For example, a stepper motor can be provided as the actuator.

With a particularly preferred variant of the method, it is provided that the movement of the spindle is recorded by means of at least one travel path encoder, and a point in time for the necessary replacement of the sliding block is calculated from the completed adjustment path. The already completed adjustment path can, for example, be added up in an open-loop or closed-loop control device.

The invention is explained below with reference to an exemplary embodiment shown in the attached drawings.

DETAILED DESCRIPTION

The adjusting system comprises at least one guide element 1 of the type described below. The adjusting system can comprise a plurality of guide elements of the type described below along with means for controlling and/or automatically actuating the guide element 1 or a plurality of guide elements.

Figure 1:
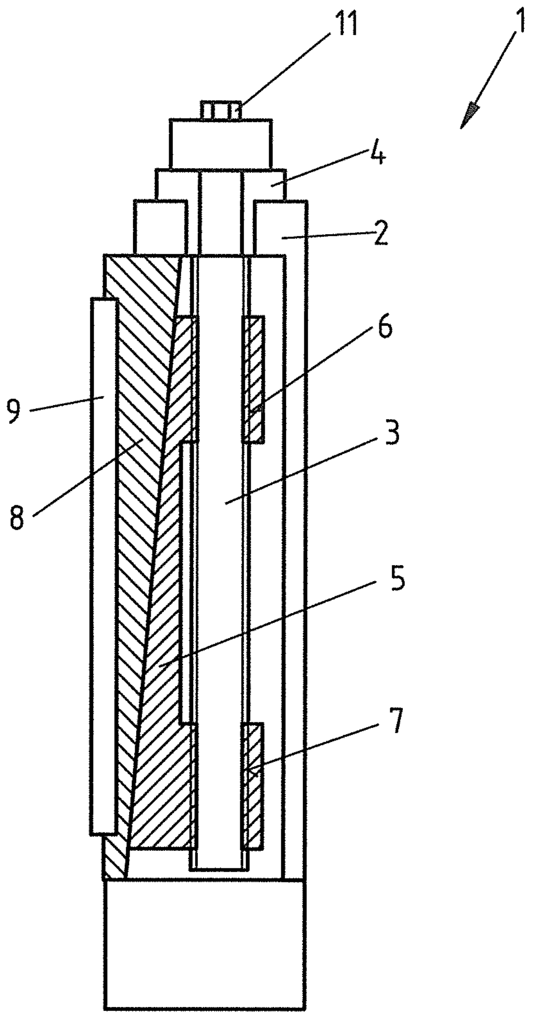
FIG. 1 is a sectional view of an adjustable guide element of the adjusting system and FIG. 2 is a sectional view of the adjustable guide element in the installed position on a press, corresponding to FIG. 1.
Figure 2:
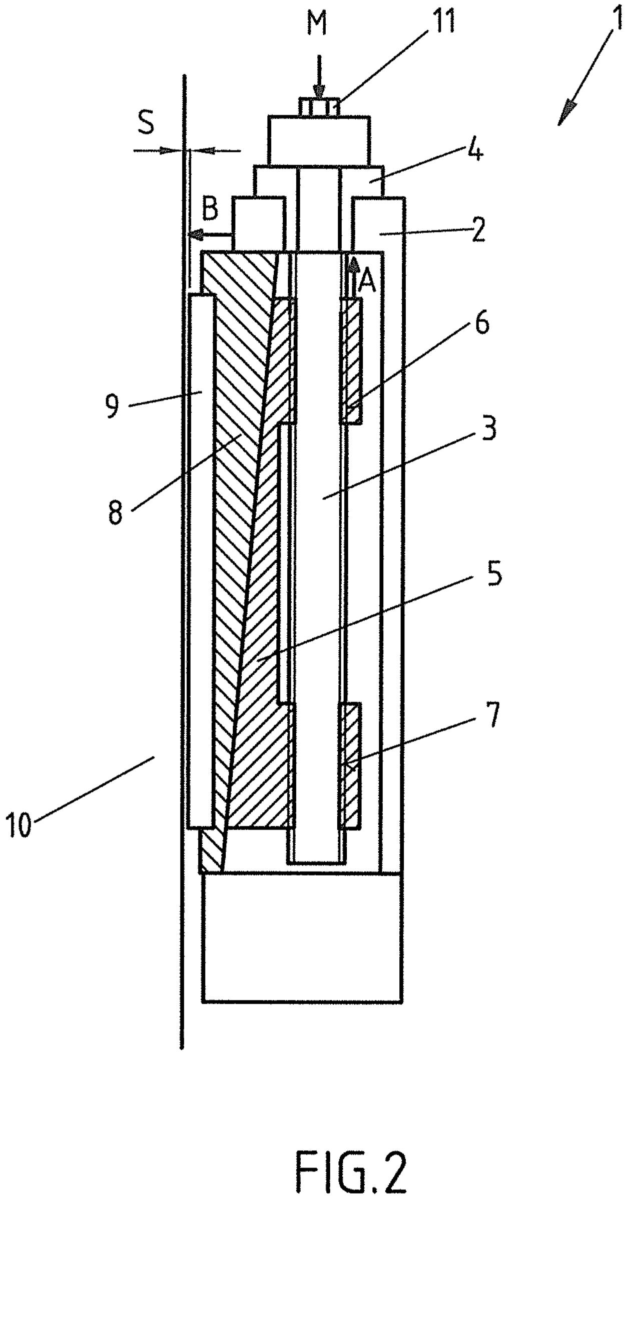

The guide element 1 shown in the figures comprises a housing 2 in which a spindle 3 extends, which is rotatably mounted in a bushing 4. The spindle 3 extends through first and second threaded bores 6, 7 of an adjusting wedge 5, which can be shifted within the housing 2 by rotating the spindle 3. The thread of the threaded bores 6, 7 is a movement thread that is designed to be complementary to the thread of the spindle 3. The adjusting wedge 5 rests with a sliding bevel against a sliding bevel of a guide wedge 8, which is connected to a sliding block 9 or a sliding plate, as the case may be. The sliding block 9 is designed as a wear part and, as can be seen from FIG. 2, is arranged parallel to and at a predetermined distance S from a guide column 10 of a press (not shown), when the guide element 1 is in the installed position. The distance S between the sliding block 9 and the guide roller 10 defines the guide play of the sliding guide.

The spindle 3 is provided at its end projecting from the housing 2 with a contact 11 for a tool or for the drive shaft of a motor (not shown). In order to adjust the play S, the spindle 3 is turned either by hand or with a motor. The rotary movement causes the adjusting wedge 5 to slide in or against the direction of arrow A shown in FIG. 2, thereby causing the guide wedge to slide in or against the direction of arrow B, also shown in FIG. 2, and either increase or decrease the distance S between the guide columns 10 and the sliding block 9.

Figure 3:
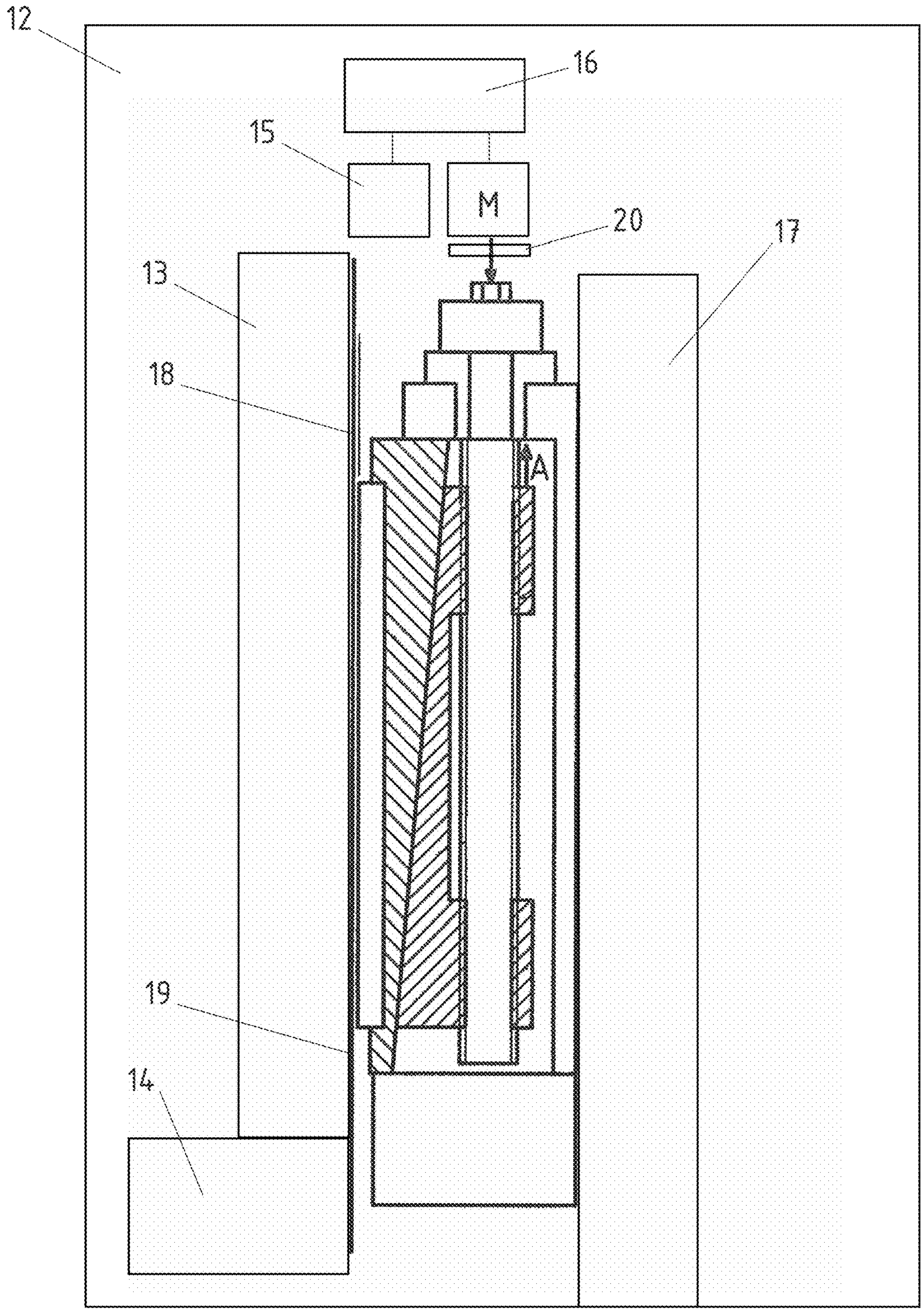
FIG. 3 is a schematic illustration of the adjustable guide element as in FIG. 2 within a press.

FIG. 3 is a schematic illustration of the adjustable guide element within a press 12. The press 12 includes a press frame 17. The movable part 13 may be a running bar or die holder, and may include a ram 14 and a sliding surface 19. A measured value encoder 15 records the guide play of the sliding guide and outputs this to the open-loop or closed-loop control device 16. A spindle is driven by an actuator in form of a servomotor M. Movement of the spindle is recorded by at least one travel path encoder 20.

LIST OF REFERENCE SIGNS

1 Guide element
2 Housing
3 Spindle
4 Bushing
5 Adjusting wedge
6 First threaded bore
7 Second threaded bore
8 Guide wedge
9 Sliding block
10 Guide columns
11 Contact
12 Press
13 Movable part, running bar, die holder
14 Ram
15 Measured value encoder
16 Open or closed loop control device
17 Press frame
18 Sliding guide
19 Sliding surface
20 Travel path encoder
M servomotor, actuator
A Arrow
B Arrow
S Distance

The invention claimed is:

1. An adjusting system for adjusting a guide play of a sliding guide for a movable part of a press, comprising:

an adjustable guide element (1), which comprises a sliding block (9), the sliding block (9) being movable transversely to a direction of movement of the movable part;

an adjusting wedge (5);

a guide wedge (8), the guide wedge (8) cooperating with the adjusting wedge (5);

a spindle drive with a spindle (3);

a measured value encoder configured to record the guide play of the sliding guide; and an open-loop or closed-loop control device;

wherein movement of the adjusting wedge (5) relative to the guide wedge (8) causes the sliding block (9) to shift perpendicularly to the direction of movement of the movable part, wherein the adjusting wedge (5) is continuously adjustable by the spindle drive, wherein the spindle (3) cooperates with a movement thread of the adjusting wedge (5), and wherein the measure value encoder records the guide play of the sliding guide and outputs this to the open-loop or closed-loop control device for automatic readjustment of the guide play.

2. The adjusting system according to claim 1, wherein the spindle (3) is driven by a servomotor.

3. The adjusting system according to claim 1, wherein the spindle (3), the adjusting wedge (5), and the guide wedge (8) are arranged in a common housing (2) and form a structural unit with the sliding block (9).

4. The adjusting system according to claim 3, wherein the spindle (3) is rotatably mounted in a bushing (4) of the housing (2).

5. The adjusting system according to claim 1, wherein the sliding block (9) is replaceably fastened to the guide wedge (8).

6. The adjusting system according to claim 1, wherein the movable part of the press has a ram or is partially designed as a ram.

7. A press with an adjusting system according to claim 1.

8. The press according to claim 7, comprising a press frame and with a running bar movable within the press frame and/or with a die holder along with sliding guides for the running bar and/or the die holder.

9. A method for adjusting a position of a sliding block of a sliding guide on a press with the adjusting system according to claim 1, comprising:

measuring an actual guide play between the sliding block and a sliding surface of the movable part;

comparing the actual guide play with a predetermined guide play target value; and rotating the spindle of the adjusting system until the actual guide play corresponds to the predetermined guide play target value.

10. The method according to claim 9, wherein the spindle is adjusted automatically via an actuator as a function of a measured value recorded by a measured value encoder.

11. The method according to claim 9, wherein movement of the spindle is recorded by a travel path encoder, and wherein a point in time for a necessary replacement of the sliding block is calculated from a completed adjustment path.

* * * * *